Figure 5:
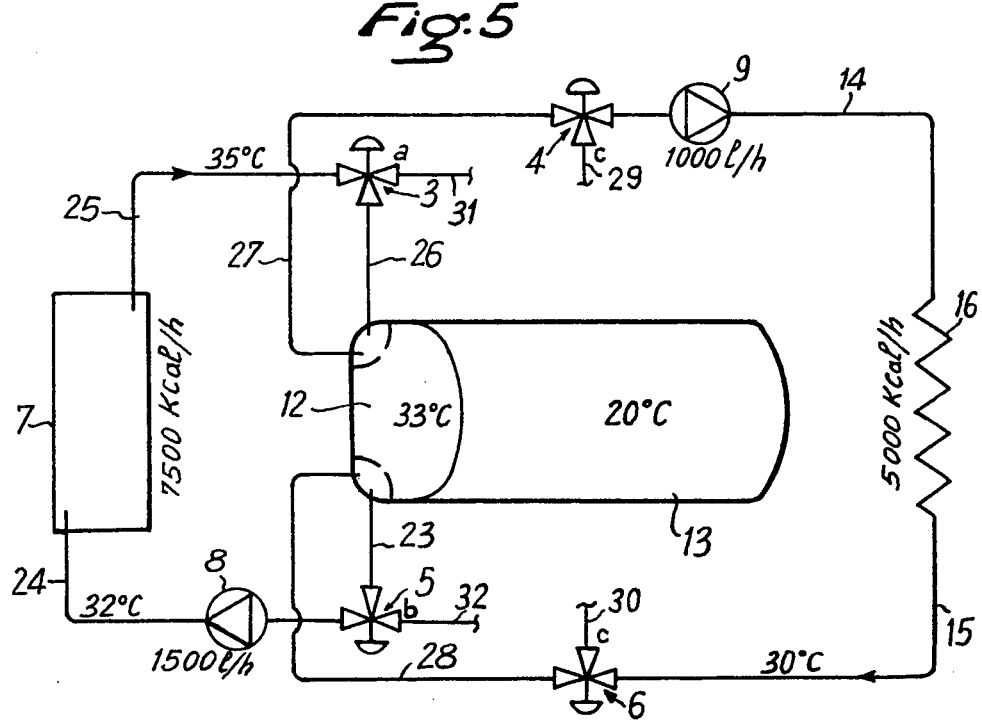

United States Patent [19]

Lessieur

[11] 4,182,489
[45] Jan. 8, 1980

[54] HEAT TRANSFER SYSTEM
[75] Inventor: Piero D. Lessieur, Paris, France
[73] Assignee: Compagnie Francaise des Petroles, Paris, France
[21] Appl. No.: 827,052
[22] Filed: Aug. 23, 1977

[30] Foreign Application Priority Data

Aug. 23, 1976 [FR] France .............................. 76 25509

[51] Int. Cl.² .............................................. F24J 3/02
[52] U.S. Cl. .................................. 126/422; 237/8 R; 126/400
[58] Field of Search ............... 126/400; 237/1 A, 8 R; 165/18; 236/12 R

[56] References Cited

U.S. PATENT DOCUMENTS

| | | | |
|---|---|---|---|
| 2,486,833 | 11/1949 | Freund | 126/400 X |
| 2,756,739 | 7/1956 | Schaub | 236/12 X |
| 3,823,572 | 7/1974 | Cochran, Jr. | 165/22 X |
| 3,931,806 | 1/1976 | Hayes | 126/400 |
| 3,996,759 | 12/1976 | Meckler | 126/400 X |
| 4,027,821 | 6/1977 | Hayes et al. | 126/400 X |
| 4,037,785 | 7/1977 | Madern | 126/400 X |
| 4,044,949 | 8/1977 | Morawetz et al. | 237/1 A |
| 4,049,845 | 9/1977 | Moog et al. | 165/18 X |

Primary Examiner—William F. O'Dea
Assistant Examiner—William E. Tapolcai, Jr.
Attorney, Agent, or Firm—Sughrue, Rothwell, Mion, Zinn and Macpeak

[57] ABSTRACT

In a positive or negative heat transfer system with an intermittent source of positive or negative thermal energy, utilization means and a reservoir of heat transfer fluid flowing between the reservoir, the source and the utilization means, the reservoir is divided into two compartments of complimentarily variable volume and excess positive or negative thermal energy not required by the utilization means is used primarily to maintain the enthalpy of the fluid in one of the compartments of the reservoir at a maximum (for positive heat transfer) or mininum (for negative heat transfer) level, the volume of that one compartment being maintained at or reduced to a minimum until the required level of enthalpy is attained.

50 Claims, 8 Drawing Figures

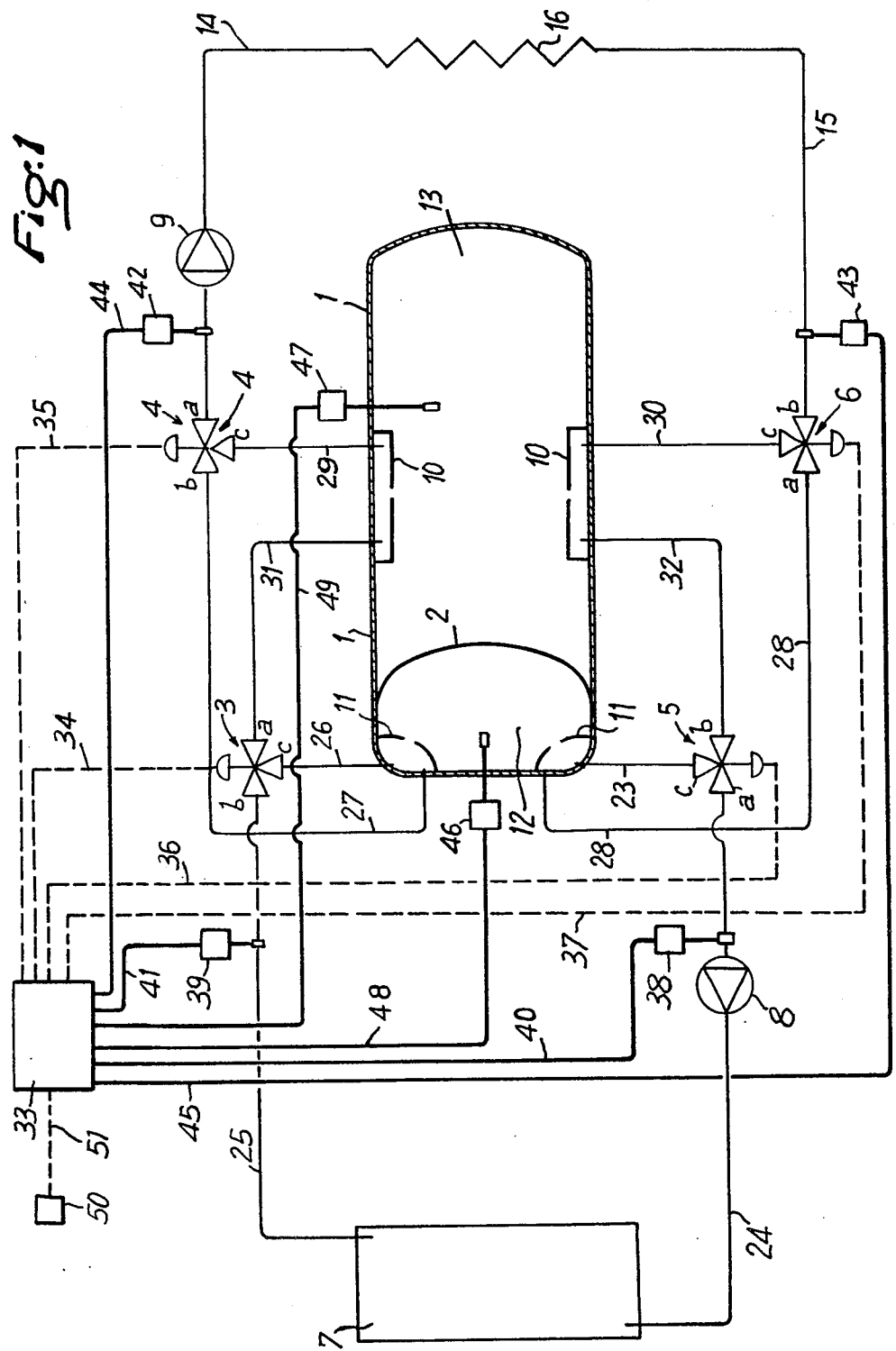

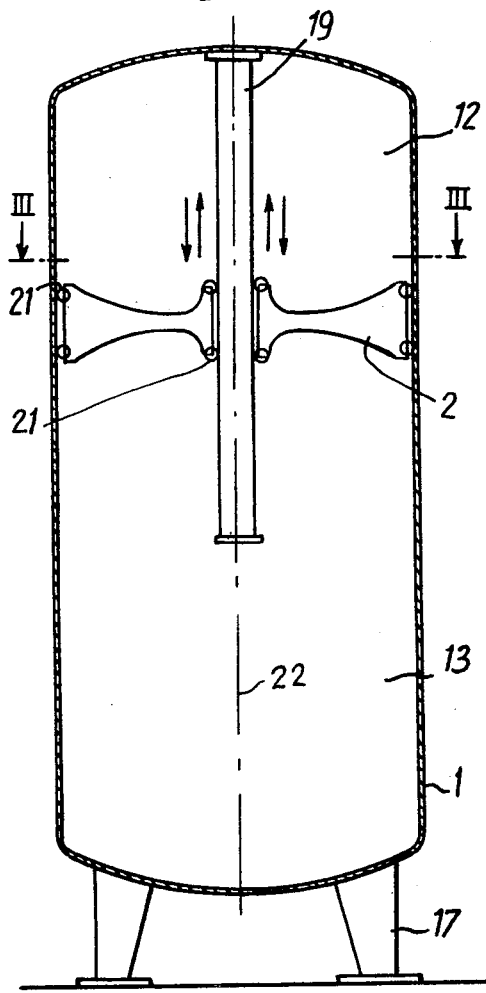
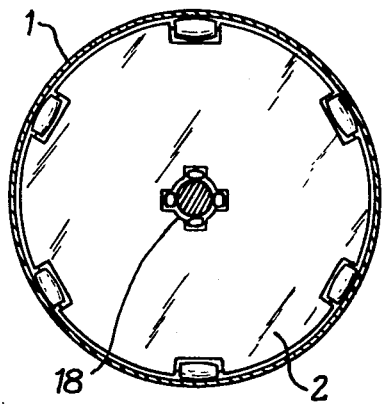
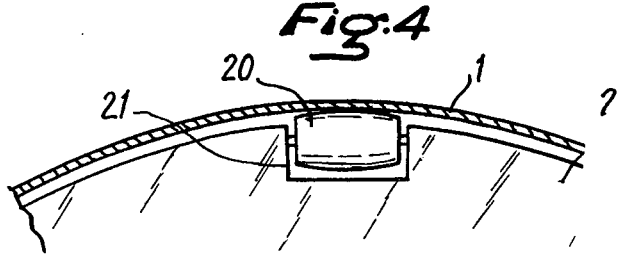

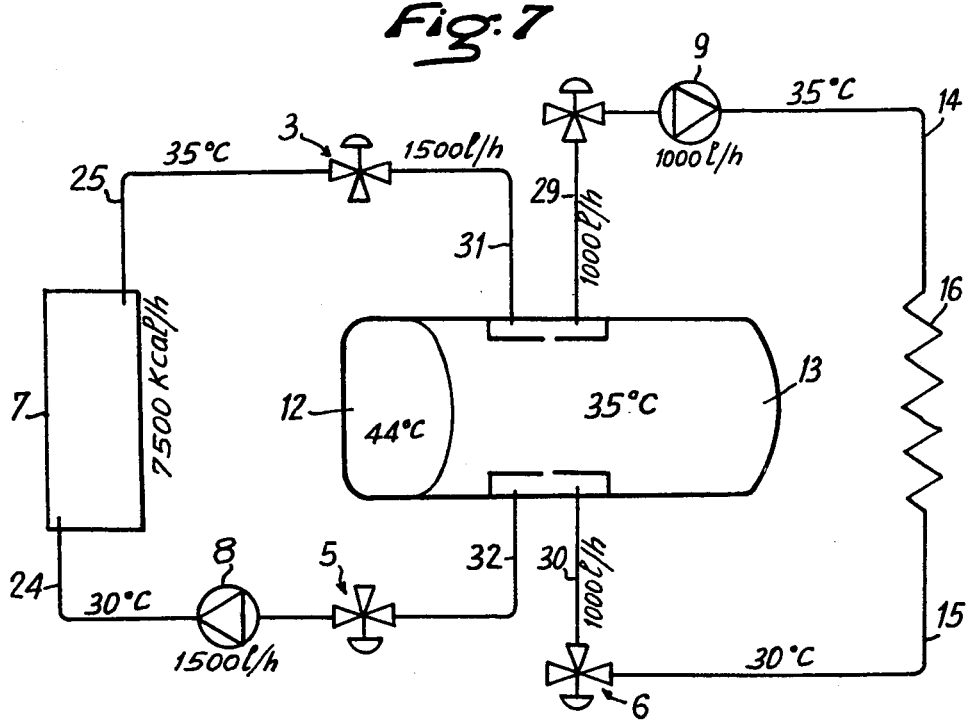
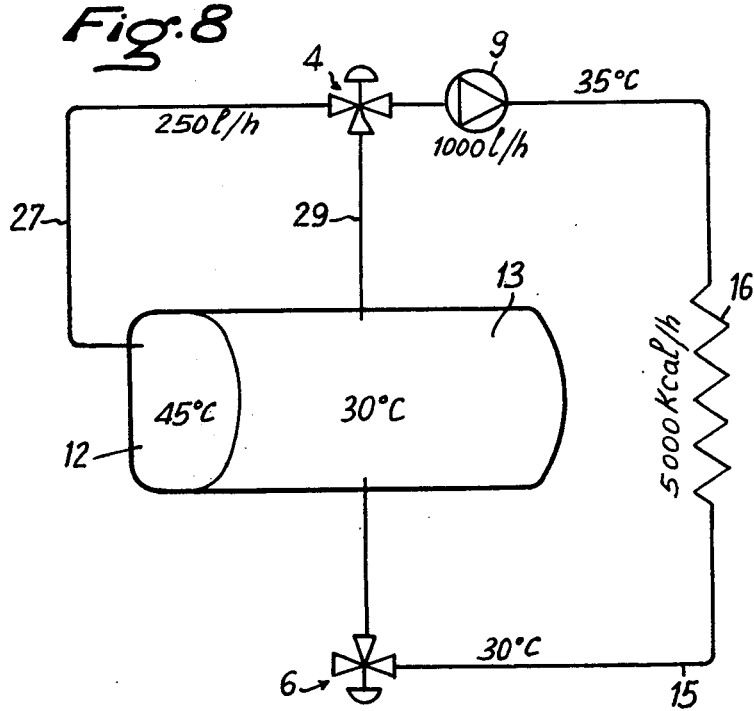

HEAT TRANSFER SYSTEM

The invention relates to heat transfer systems and apparatus including a reservoir for storing positive or negative calories.

Various kinds of apparatus, including heating systems and air conditioning systems, store hot or cold water or other fluid to buffer irregular or discontinuous inputs of heat from a heating unit or cold from a cooling unit. In a heating system, the energy input required when starting up the system, or when the temperature of the stored fluid falls to a very low value at the end of an operating cycle, increases with the difference between the real temperature of the fluid and the optimum value of its temperature.

For example, a refrigerating unit of the absorption type has an efficiency of 0.6 when using water at a temperature of 88° C., so that if the unit is to provide a negative heat flow of 1,000 Kcal/h, the energy absorbed by it will be 1,000/0.6=1,670 Kcal/h. If the temperature of the water is 80° C., the efficiency drops to 0.2, so that the same cooling effect requires an energy input of 1,000/0.2=5,000 Kcal/h. This is a significant increase in the power requirements of the unit.

Enthalpy degradation in conventional storage reservoirs reduces the available power and increases the amount of energy required for carrying out a given thermodynamic process. In order to reduce the effects of enthalpy degradation, it has been proposed to use two or more reservoirs connected in series, so that there is at least a certain amount of heat stored in a reservoir of predetermined volume, the second reservoir allowing for any topping up required.

The number of reservoirs in such systems cannot be increased in an indiscriminate manner, however, principally because of the increased complexity of the flow circuits. Also, the temperature degradation depends on the volume of the selected reservoir, the hottest or the coldest, as the case may be. The necessary amount of heat is therefore only available after heating of a predetermined volume, which represents an immediate and significant loss.

It is an object of the invention to provide a method of effecting heat transfer in which the enthalpy degradation is limited and which requires only one reservoir thereby doing away with the need for a multiplicity of control circuits which are required for systems having reservoirs connected in series.

It is a principal object of the invention to provide a method of effecting heat transfer in a system comprising a reservoir of heat transfer fluid connected to means operative to change the enthalpy of said fluid and to utilisation means whose temperature is to be changed by heat transfer with said heat transfer fluid, said reservoir comprising two compartments whose volumes are complimentarily variable, the method comprising circulating heat transfer fluid between one of said compartments of said reservoir and said enthalpy changing means and circulating heat transfer fluid between said one compartment and said utilisation means, wherein said one compartment is that one of said two compartments containing heat transfer fluid whose enthalpy is closer to the enthalpy of fluid circulating from said enthalpy changing means.

According to another object of the invention there is provided a method of effecting a positive heat transfer in a system comprising a reservoir of heat transfer fluid connected to a heating means and to utilisation means to be heated by heat transfer with said heat transfer fluid, said reservoir comprising two compartments whose volumes are complimentarily variable, the method comprising circulating said heat transfer fluid between said heating means and one of said compartments of said reservoir and circulating said heat transfer fluid between said one compartment and said utilisation means, wherein said one compartment is that one of said compartments containing heat transfer fluid at the higher enthalpy level.

The above method provides great flexibility in operation, as it is only necessary to decrease the volume of the one compartment so that it corresponds to the minimum quantity of heat required for immediate use, the heating means being required only to increase the enthalpy of the reduced volume, during a significantly reduced period of time. The efficiency of the system can therefore be rapidly maximised.

Another object of the invention is to maintain this efficiency while increasing the quantity of fluid stored in the one compartment and without enthalpy degradation. This is achieved by controlling the increase in the volume of the one compartment in accordance with the power absorbed by the utilisation means.

The quantity of stored fluid can therefore be increased at will, depending only on the utilisation means, the efficiency of the system remaining at the selected maximum value and the enthalpy of the fluid in the one compartment remaining practically constant in the absence of volume changes.

Another object of the invention is to limit the increase in the enthalpy of the fluid contained in one compartment for volumes greater than a preset value, by increasing the enthalpy in the other one of the compartments.

Thus it is only necessary to control the temperatures and flow rates to make use of any excess heat input from the heating means, after maintaining the enthalpy in the one compartment and delivering heat to the utilisation means, by progressively increasing the enthalpy of the other compartment.

The invention is equally applicable to cooling systems and it is another object of the invention to provide a method of effecting a negative heat transfer in a system comprising a reservoir of heat transfer fluid connected to cooling means and to utilisation means to be cooled by heat transfer with the heat transfer fluid, said reservoir comprising two compartments whose volumes are complimentarily variable, the method comprising circulating the heat transfer fluid between said cooling means and one of said compartments of said reservoir and circulating the heat transfer fluid between said one compartment and said utilisation means, wherein said one compartment is that containing heat transfer fluid at the lower enthalpy level.

According to yet another object of the invention there is provided apparatus for carrying out the above methods comprising means for changing the enthalpy of the fluid;

a reservoir for heat exchange fluid comprising two compartments whose volumes are complimentarily variable;

utilisation means whose temperature is to be changed by heat transfer with said heat transfer fluid;

a first input circuit connecting said enthalpy changing means to one of said compartments of said reservoir;

a first output circuit connecting said enthalpy changing means to said one compartment;

a second input circuit connecting said utilisation means to said one compartment; and a second output circuit connecting said utilisation means to said one compartment.

Temperature sensors may be provided in the compartments and at the inlet and outlet of the enthalpy changing means to enable the process to be carried into effect without difficulty.

Advantageously the apparatus includes a pump, the pump in said first circuit being adapted to provide a higher output than the pump in said second circuit.

Multi-way walves and pumps may be provided in the circuits together with means for controlling the pumps and valves so as to maintain the enthalpy in the one compartment at its highest (for a heating system) or lowest (for a cooling system) value, excess positive or negative thermal energy being used first to increase the volume of the one compartment and then to heat or cool the fluid in the other compartment.

It will be apparent that the above described methods and apparatus are equally suitable for heating and cooling systems, and that more than one reservoir may be incorporated in a system, if required, which would facilitate system maintenance and provide operational flexibility.

The invention will be more fully understood from the following description of an embodiment thereof which is given, by way of example only, with reference to the accompanying drawings.

In the drawings:

FIG. 1 is a general schematic view of an embodiment of the apparatus according to the present invention, FIG. 2 is a schematic axial cross-section through means for dividing the reservoir into two compartments of variable volume, FIG. 3 is a schematic cross-section on the line III—III in FIG. 2, FIG. 4 is a view of part of FIG. 3 to a larger scale, FIGS. 5 to 8 are schematic views showing the apparatus of FIG. 1 during various stages in the operation of the apparatus.

Referring to FIG. 1, a reservoir 1 comprises two compartments 12 and 13 defined by the walls of the reservoir and by a movable or deformable separator 2. This may consist, for example, of a membrane with its periphery attached to the walls of the reservoir, as shown in FIG. 1, or (and especially if the reservoir is vertical) a disc, as shown in FIGS. 2 to 4. This disc may be of the floating type. The reservoir may be mounted on feet 17. The disc 2 is guided by a cylindrical guide 19 attached to the reservoir 1 and extending along its axis 22, and by the inside wall of the reservoir. The disc has an opening 18 through which the guide 19 passes, and rollers or skids 20 with a low coefficient of friction are mounted in recesses 21 around its perimeter and around the opening 18, as shown in FIGS. 3 and 4. As is evident from FIG. 2, when disc 2 is in its uppermost position with rollers 21 in abutment with the juncture between the edge of the vertical walls and the top of reservoir 1, because of the concave nature of disc 2 and the outwardly-bowed shape of the top of reservoir 1, there will be left above disc 2 a fixed predetermined minimum volume.

An intermittently operated device 7, (FIG. 1) which is a cooling device or a heating device, e.g. including solar panels or cells, is connected to compartment 12 via a circuit including a pipe 23, paths c and a of a valve 5, and a pipe 24, which includes a pump 8 for conveying fluid from the compartment 12 to the device 7. Compartment 12 is also connected to the device 7 via a circuit including a pipe 25, paths b and c of a valve 3, and a pipe 26, through which the fluid is returned to compartment 12.

Compartment 12 can also be connected to a user circuit shown schematically by pipes 14 and 15, and a utilisation means 16 by a pipe 27, paths b and a of a valve 4 and a pump 9, the fluid being returned from the user circuit through paths b and a of a valve 6 and a pipe 28.

Compartment 13 can be connected to the user circuit 14, 15, 16 by pipes 29 and 30 and path c of each of the valves 4 and 6. Pipes 31 and 32 connect compartment 13 to the device 7 or to compartment 12, respectively, via paths a and b of valves 3 and 5.

Baffles 10 in compartment 13 and baffles 11 in compartment 12 shield the liquid in the respective compartments from disturbances resulting from varying flow rates and temperatures in the pipes leading to the compartments.

It will be clear that the storage reservoir 1 may be made of any suitable material, including metals, concrete and plastics materials. The cylindrical guide 19 (FIG. 2) may, for example, be made of a plastics material, and the rollers or skids 20 of p.t.f.e.

A control panel 33 operates the valves 3, 4, 5 and 6 via respective connections 34, 35, 36 and 37 and may be of any suitable type, for example using electronic circuitry. The valves may be automatically operated as a function of the temperatures measured by sensors situated in the user circuit and energy supply pipes. In the embodiment shown in FIG. 1, temperature sensors 38 and 39 are situated in the inlet and outlet conduits 24 and 25, respectively, of the heating or cooling device 7, and are connected to the control panel 33 by respective cables 40 and 41. Likewise, sensors 42 and 43 situated in the user circuit inlet conduit 14 and outlet conduit 15, respectively, are connected to the panel 33 via respective cables 44 and 45. Sensors 46 and 47 measure the temperatures in compartments 12 and 13, respectively, and are connected to the control panel 33 via respective cables 48 and 49. Ambient temperature is measured by a sensor 50 connected to the panel 33 by a cable 51.

In order to describe an embodiment of the process according to the invention, and of the apparatus for carrying out the process, it will be supposed that the system is intended to heat the user circuit and that the compartments 12 and 13 of the storage reservoir are initially cold. It will be understood that if the system were instead intended to cool the user circuit 14, 15, 16, the initial temperatures in compartments 12 and 13 would be at maximum values, rather than minimum values appertaining to the selected example to be described. For convenience, in all the following examples, it is supposed that the system is to supply heat to the user circuit 16.

During an initial stage the contents of the compartment 12 are heated with this compartment at its minimum volume, so as to increase their enthalpy as quickly as possible. The hot water is circulated through the circuits 23, 24, 7, 25 and 26, as shown in FIG. 5, until the required temperature is obtained. During this period the compartment 13 is isolated from the rest of the system by closing path a of valve 3 and path c of valve 4, which are connected to pipes 31 and 29, respectively, and by closing path b of valve 5 and path c of valve 6, which are connected to pipes 32 and 30 respectively. If the heat output of the heating device 7, for example, 7,500 Kcal/h is sufficient to satisfy the requirements of the user circuit, which may, for example, call for 1,000 l/h of water at 35° C., the user circuit pump 9 is operated, the pump 8 which supplies the heating device 7 producing a flow of 1,500 l/h. The pipe 26 therefore supplies the compartment 12 with 500 l/h of water at 35° C. The temperature sensor 43 at the outlet from the user circuit may indicate a temperature of, for example, 30° C., which is the temperature of the water returned to the compartment 12 through the pipe 28. As the pump 8 produces a flow of 1,500 l/h, the temperature of the water drawn off through the pipe 23 depends on the mixing of 1,000 l/h of water at 30° C. with 500 l/h at 35° C. Thus the water fed to the heating device 7 through the pipe 24, at a rate of 1,500 l/h, is at a temperature of 32° C., instead of 30° C., which represents a significant increase in the efficiency of the system, the sensors 46 and 47 giving temperature readings of 33° C. and 20° C., respectively (FIG. 5).

Figure 6:
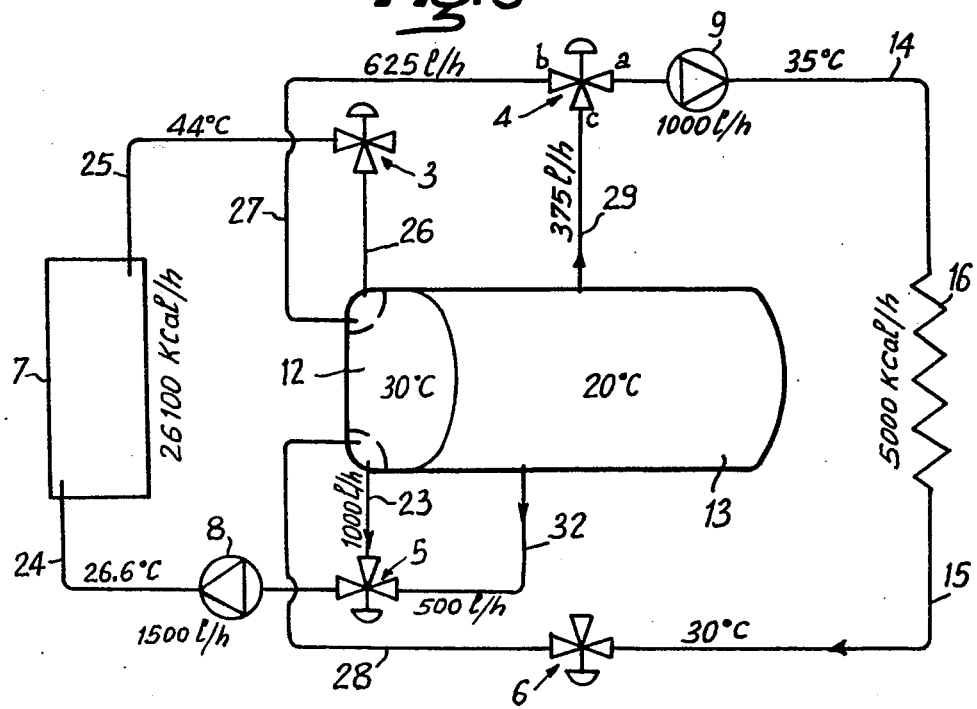

If the heat source 7 is more than capable of meeting the needs of the user circuit 16, producing for example, 26,100 Kcal/h, when the user circuit 16 requires only 5,000 Kcal/h, the automatic control unit 33 operates valves 3, 4, 5 and 6 to take advantage of the excess heat input by increasing the volume of the compartment 12 which stores water at a temperature higher than that of the water in compartment 13. FIG. 6 shows the circuit as set by the control unit 33 for this purpose. 1,500 l/h of water at 44° C. are supplied to the compartment 12 through pipes 25 and 26. The valve 4 is set so that the pump 9 receives 625 l/h of water from compartment 12, through pipe 27, and 375 l/h of water at 20° C. through the pipe 29. As a result, the user circuit 16 receives 1,000 l/h of water at 35° C. Water at 30° C. is returned to the bottom of compartment 12 through the pipe 28, and the valve 5 is set to provide a mixture of 500 l/h of water at 20° C. from compartment 13 via pipe 32 and 1,000 l/h of water at about 30° C. from the bottom of compartment 12. The mixture enters the heat source 7 via the pipe 24 at a temperature of 26.6° C., at a flow rate of 1,500 l/h.

As in the preceding example, the efficiency of the unit is increased, in that water at 26.6° C. is used instead of water at 20° C., and the capacity of the higher enthalpy compartment 12 is increased.

FIG. 7 shows the circuit as set by the control unit 33 when the cycle shown in FIG. 6 has resulted in the storage of the required quantity of heat in compartment 12. Supposing, for the sake of example, that compartment 12 is at 44° C. and compartment 13 at 35° C., and that the heat input exceeds the user circuit requirements, the compartment 12 is isolated by means of valves 3 and 5, so that pipes 23 and 26 are no longer used, and the temperature in compartment 13 is increased.

To this end, the pump 8 supplies 1,500 l/h of water at 30° C. to the heat source 7, taking the water from the bottom of compartment 13 via the pipe 32. It will be assumed that the heat source 7 supplies 7,500 kcal/h. 1,500 l/h of water at 35° C. are returned to the top of compartment 13 through pipes 25 and 31. The pump 9 draws off 1,000 l/h from compartment 13 through the pipe 29, and this is passed through the user circuit 16 to provide 5000 kcal/h of heat. Water at a temperature of 30° C. is returned to the bottom of compartment 13 via the pipe 30, which is located close to the take-off pipe 32. In the manner just described, the temperature of the compartment 13 is increased, after first increasing the temperature and then the volume of compartment 12.

When the heat source 7 ceases to supply heat, the circuit shown in FIG. 8 is set up.

It is assumed that compartment 12 is at 45° C. and compartment 13 at 30° C. If the user circuit still requires 5,000 Kcal/h, the control unit 33 operates the valve 4 so that the pump 9 receives 1,000 l/h of water consisting of a mixture of 250 l/h at 45° C. drawn from compartment 12 through pipe 27 and 750 l/h at 30° C. drawn from compartment 13 through pipe 29. As a result, the pump 9 supplies the user circuit 16 with 1,000 l/h of water at 35° C., the volume of compartment 12 decreasing, but still contributing to the increased efficiency of the system, the process utilised enabling enthalpy degradation in this compartment to be avoided.

For example, if the temperature in compartment 13 drops to 25° C., the control unit 33 modifies the mixture received by the pump 9, the 1,000 l/h at 35° C. being derived from 500 l/h at 45° C. drawn off through pipe 27 and 500 l/h at 25° C. drawn off from compartment 13 through the pipe 29, so that the rate at which water is drawn off from compartment 13 is reduced. High efficiency is therefore maintained, by accelerating the rate at which the volume of compartment 12 is reduced.

When the temperature in compartment 13 drops to 20° C., the pipe 27 draws off 600 l/h of water at 45° C. from compartment 12, and pipe 29 draws off only 400 l/h from compartment 13, the resulting mixture fed to pipe 14 and thus to the user circuit 16 still providing 1,000 l/h at 35° C. This continues until compartment 12 reaches its minimum volume.

As the control unit 33 can be of any suitable type, it will not be described but it will be understood that it may be designed to incorporate any kind of automatic operating programme, and that any such programme may be interrupted or modified at any time.

Likewise, the apparatus described by way of example may be modified in various ways without departing from the scope of the invention. In particular, the mixers surrounded by baffles 10 and 11 may be replaced with any suitable equivalents.

It will be clear that the above described apparatus can be used in a similar manner to cool the utilisation circuit 16, the means 7 being a cooling device. The control unit 33 then operates the apparatus so as to minimise the enthalpy of compartment 12.

In another modification the utilisation circuit 16 may be the heating means of a cooling device, the cooling device in turn being connected as the cooling means of a further system similar to that described above including a two compartment reservoir and utilisation means which are to be cooled by the further system.

What is claimed:

1. A method of effecting heat transfer in a system comprising a reservoir of heat transfer fluid connected to means operative to change the enthalpy of said fluid and to utilisation means whose temperature is to be changed by heat transfer with said heat transfer fluid, said reservoir comprising two compartments whose volumes are complementarily variable, the method comprising determining which one of said compartments contains heat transfer fluid whose temperature is closer to the temperature of fluid circulating from said enthalpy changing means, circulating heat transfer fluid between said one of said compartments of said reservoir and said enthalpy changing means, and simultaneously circulating heat transfer fluid between said one compartment and said utilisation means.

2. A method according to claim 1, including increasing the volume of said one compartment when the temperature thereof has reached a pre-set level by supplying additional fluid to said one compartment from said enthalpy changing means and simultaneously withdrawing fluid from the other of said compartments.

3. A method according to claim 2, comprising circulating heat transfer fluid between said other compartment of said reservoir and said enthalpy changing means and simultaneously between said other compartment and said utilisation means, when said one compartment has reached a pre-set maximum volume.

4. A method as claimed in claim 1, comprising ceasing circulation of heat transfer fluid through said enthalpy changing means and circulating heat transfer fluid between said utilisation means and both of said compartments simultaneously, and controlling the quantity of fluid withdrawn from the respective said compartments in dependence on the temperature of heat transfer fluid in said compartments and the thermal requirements of said utilisation means so that the minimum quantity of heat transfer fluid is withdrawn from said one compartment.

5. A method as claimed in claim 4, wherein fluid withdrawn from said one compartment is returned to said other compartment so that the volume of said one compartment is thereby reduced.

6. A method of effecting a positive heat transfer in a system comprising a reservoir of heat transfer fluid connected to heating means and to utilisation means to be heated by heat transfer with said heat transfer fluid, said reservoir comprising two compartments whose volumes are complementarily variable either one of which may contain heat transfer fluid at the higher temperature, the method comprising determining which one of said compartments contains heat transfer fluid of the higher temperature, circulating said heat transfer fluid between said heating means and one of said compartments of said reservoir, and simultaneously circulating said heat transfer fluid between said one compartment and said utilisation means.

7. A method as claimed in claim 6, comprising maintaining the volume of said one compartment constant until the temperature of the heat transfer fluid in said one compartment has reached a pre-set maximum level.

8. A method as claimed in claim 7, wherein said constant volume of said one compartment is a pre-set minimum volume.

9. A method as claimed in claim 7, including, when the temperature of the heat transfer fluid in said one compartment has reached said pre-set maximum level, supplying fluid to said one compartment from said heating means to increase the volume thereof, fluid being withdrawn from the other one of said compartments to correspondingly decrease the volume of said other compartment.

10. A method as claimed in claim 9, wherein said volume of said other compartment is decreased by withdrawing fluid therefrom and mixing said withdrawn fluid with fluid circulating to said utilisation means.

11. A method as claimed in claim 9, wherein said volume of said other compartment is decreased by withdrawing fluid therefrom and mixing said withdrawn fluid with fluid circulating from said utilisation means.

12. A method as claimed in claim 9, wherein said volume of said other compartment is decreased by withdrawing fluid therefrom, mixing some of said withdrawn fluid with fluid circulating to said utilisation means and mixing the rest of said withdrawn fluid with fluid circulating from said utilisation means.

13. A method as claimed in claim 12, including controlling the rate at which fluid is supplied to said utilisation means from said other compartment so as to maintain a pre-determined rate of flow of enthalpy to said utilisation means.

14. A method as claimed in claim 9, including, when said one compartment is at a pre-set maximum volume, discontinuing fluid circulation through said one compartment and causing fluid to circulate from said heating means to said other compartment simultaneously with circulation of fluid from said other compartment to said utilisation means.

15. A method as claimed in claim 6, including discontinuing circulation of fluid through said heating means and withdrawing fluid from both of said compartments at rates which provide a pre-determined rate of flow of enthalpy to said utilisation means.

16. A method as claimed in claim 15, including controlling the rates of withdrawal of fluid from said compartments so that the rate of flow of fluid from said one compartment is the minimum consistent with the thermal requirements of said utilisation means.

17. A method as claimed in claim 15, including reducing the volume of said one compartment by returning fluid withdrawn from said one compartment to said other compartment, until said one compartment reaches a minimum volume.

18. A method as claimed in claim 6, including mixing the fluid circulating from said one compartment to said utilisation means with fluid from the other of said compartments, and controlling the rates of flow of fluids from said compartments in dependence on the enthalpies thereof to provide a pre-determined rate of flow of fluid to said utilisation means at a pre-determined temperature.

19. A method as claimed in claim 6, wherein the rate of flow of fluid through said heating means is controlled to be greater than the rate of flow of fluid flowing from said one compartment to said utilisation means and part of the fluid flowing from said heating means to said one compartment flows from said one compartment towards said utilisation means substantially without change of temperature and wherein the other part of the fluid flows into said one compartment to increase the enthalpy of the fluid therein.

20. A method as claimed in claim 19, wherein the fluid flowing into said one compartment from said utilisation means is mixed with fluid flowing from said one compartment to said heating means and flows to said heating means substantially without changing the temperature of the fluid in said one compartment.

21. A method as claimed in claim 6, wherein said utilisation means is the heating means of a cooling device, the cooling device forming the cooling means of a second heat transfer system, fluid flowing through the cooling means being circulated to one of two compartments of a reservoir through which fluid circulates to a utilisation device comprising a second cooling means, the one compartment being that one of the two compartments at the lower temperature level.

22. A method of effecting a negative heat transfer in a system comprising a reservoir of heat transfer fluid connected to cooling means and to utilisation means to be cooled by heat transfer with the heat transfer fluid, said reservoir comprising two compartments whose volumes are complementarily variable, the method comprising determining which one of said compartments contains heat transfer fluid of the lower temperature, circulating the heat transfer fluid between said cooling means and one of said compartments of said reservoir, and simultaneously circulating the heat transfer fluid between said one compartment and said utilisation means.

23. A method as claimed in claim 22, comprising maintaining the volume of said one compartment constant until the temperature of the heat transfer fluid in said one compartment has decreased to a pre-set minimum level.

24. A method as claimed in claim 23, wherein said constant volume of said one compartment is a pre-set minimum volume.

25. A method as claimed in claim 23, including, when the temperature of the fluid in said one compartment has decreased to said pre-set level, supplying fluid to said one compartment from said cooling means to increase the volume thereof, fluid being withdrawn from the other of said compartments to correspondingly decrease the volume of said other compartment.

26. A method as claimed in claim 25, wherein said volume of said other compartment is decreased by withdrawing fluid therefrom and mixing said withdrawn fluid with fluid circulating to said utilisation means.

27. A method as claimed in claim 25, wherein said volume of said other compartment is decreased by withdrawing fluid therefrom and mixing said withdrawn fluid with fluid circulating from said utilisation means.

28. A method as claimed in claim 26, including controlling the rate at which fluid is supplied to said utilisation means from said other compartment so as to maintain a pre-determined rate of flow of enthalpy from said utilisation means.

29. A method as claimed in claim 25, including, when said one compartment is at a pre-set maximum volume, discontinuing fluid circulation through said one compartment and causing fluid to circulate from said cooling means to said other compartment simultaneously with circulation of fluid from said other compartment to said utilisation means.

30. A method as claimed in claim 22, including discontinuing circulation of fluid through said cooling means and withdrawing fluid from both of said compartments at rates which provide a pre-determined rate of flow of enthalpy from said utilisation means.

31. A method as claimed in claim 30, including controlling the rate of withdrawal of fluids from said compartments so that the rate of flow of fluid from said one compartment is the minimum consistent with the thermal requirements of said utilisation means.

32. A method as claimed in claim 30, including reducing the volume of said one compartment by returning fluid withdrawn from said one compartment to said other compartment, until said one compartment reaches a minimum volume.

33. A method as claimed in claim 22, including mixing the fluid circulating from said one compartment to said utilisation means with fluid from the other of said compartments, and controlling the rates of flow of fluid from said compartments in dependence on the enthalpies thereof to provide a pre-determined rate of flow of fluid to said utilisation means at a pre-determined temperature.

34. A method as claimed in claim 22, wherein said cooling means provides a variable amount of negative thermal energy and the rate of flow of fluid therethrough is controlled in dependence on the instantaneous negative thermal energy provided thereby.

35. A method as claimed in claim 34, wherein the rate of flow of fluid through said cooling means is controlled to be greater than the rate of flow of fluid flowing from said one compartment to said utilisation means and part of the fluid flowing from said cooling means to said one compartment is circulated from said one compartment towards said utilisation means substantially without change of temperature, the other part of the fluid flows into said one compartment to decrease the enthalpy of the fluid therein.

36. A method as claimed in claim 35, wherein the fluid flowing into said one compartment from said utilisation means is mixed with fluid flowing from said one compartment to said heating means substantially without effecting the enthalpy of the fluid in said one compartment.

37. Apparatus for effecting heat transfer between an intermittent source of thermal energy and utilisation means comprising:
 a reservoir for heat exchange fluid comprising two compartments whose volumes are complementarily variable;
 means for changing the enthalpy of said heat exchange fluid;
 utilisation means whose temperature is to be changed by heat transfer with said heat transfer fluid;
 means for determining which one of said compartments contains heat transfer fluid whose temperature is closer to the temperature of fluid circulating from said enthalpy changing means;
 a first input circuit for connecting said enthalpy changing means to one of said compartments of said reservoir in response to said determining means;
 a first output circuit for connecting said enthalpy changing means to said one compartment in response to said determining means;
 a second input circuit for connecting said utilisation means to said one compartment in response to said determining means; and
 a second output circuit for connecting said utilisation means to said one compartment in response to said determining means.

38. Apparatus as claimed in claim 37, wherein one of said first circuits and one of said second circuits includes a pump, the pump in said first circuit being adapted to provide a higher output than the pump in said second circuit.

39. Apparatus as claimed in claim 37, including a third input circuit connecting said enthalpy changing means to the other one of said compartments, a third output circuit connecting said enthalpy changing means to said other compartment, a fourth input circuit connecting said utilisation means to said other compartment, and a fourth output circuit connecting said utilisation means to said other compartment.

40. Apparatus as claimed in claim 39, wherein each of said circuits includes a valve for controlling the rate of flow of fluid through the respective circuits.

41. Apparatus as claimed in claim 39, wherein said first and third input circuits are connected by a multi-way valve to a common connection to said enthalpy changing means, said first and third output circuits are connected by a multi-way valve to a common connection to said enthalpy changing means, said second and fourth input circuits are connected by a multi-way valve to a common connection to said utilisation means, and said second and fourth output circuits are connected by a multi-way valve to a common connection to said enthalpy changing means.

42. Apparatus as claimed in claim 41, including a pump connected in one of said common connections to said enthalpy changing means and a pump connected in one of said common connections to said utilisation means.

43. Apparatus as claimed in claim 42, including means for measuring the temperature of fluid in said two compartments and the temperature of the fluid flowing to and from said enthalpy changing means and to and from said utilisation means, and control means for controlling said valves in dependence on the outputs of said temperature measuring means.

44. Apparatus as claimed in claim 37, wherein said first input and second output circuits are connected to said first compartment adjacent each other and are surrounded by baffle means within said first compartment and said first output and second input circuits are connected to said first compartment adjacent each other and surrounded by baffle means within said first compartment.

45. Apparatus as claimed in claim 44, wherein said baffles are arranged opposite one another.

46. Apparatus as claimed in claim 37, wherein said enthalpy changing means includes solar energy collecting means.

47. Apparatus as claimed in claim 44, wherein said utilisation means comprise the heating means of a cooling device which is connected as the enthalpy changing means of a corresponding heat transfer apparatus.

48. A method for transferring thermal energy from an intermittent thermal energy source to utilisation means in which a heat transfer fluid reservoir is provided having first and second compartments the volume of which are complementarily variable, comprising the steps of:

circulating heat transfer fluid between each of said first and second compartments and said utilisation means, the proportion of fluid circulated from each of said first and second compartments and the relative volumes of each of said first and second compartments being determined to provide the temperature of the heat transfer fluid circulated to said utilisation means at a predetermined temperature;

circulating said heat transfer fluid between only the one of said compartments having the lower volume when the temperature of the heat transfer fluid in both of said compartments is significantly different from said predetermined temperature; and simultaneously maintaining the volume of said one of said compartments at a predetermined minimum volume.

49. The method of claim 48, further comprising the step of:

increasing the volume of said one compartment and simultaneously decreasing the volume of said second compartment once said utilisation means has reached said predetermined temperature.

50. Apparatus for effecting heat transfer between an intermittent source of thermal energy and utilisation means, the temperature of which is to be changed by thermal energy produced by said source of thermal energy, comprising in combination:

a reservoir for heat transfer fluid having two compartments whose volumes are complementarily variable;

a source of thermal energy;

means for determining which one of said compartments contains heat transfer fluid of a temperature closest to that to which said utilisation means is to be changed;

means for circulating heat transfer fluid between said source of thermal energy and said one compartment; and means for simultaneously circulating heat transfer fluid between said utilisation means and said one compartment.

* * * * *